Nov. 21, 1961  W. F. ROSSITER  3,009,471
SLEEPING BUNK ATTACHMENT FOR VEHICLES
Filed April 11, 1960  2 Sheets-Sheet 1

INVENTOR.
Wayne F. Rossiter
BY *Stanley Bialy*
Attorney

Nov. 21, 1961 W. F. ROSSITER 3,009,471
SLEEPING BUNK ATTACHMENT FOR VEHICLES
Filed April 11, 1960 2 Sheets-Sheet 2
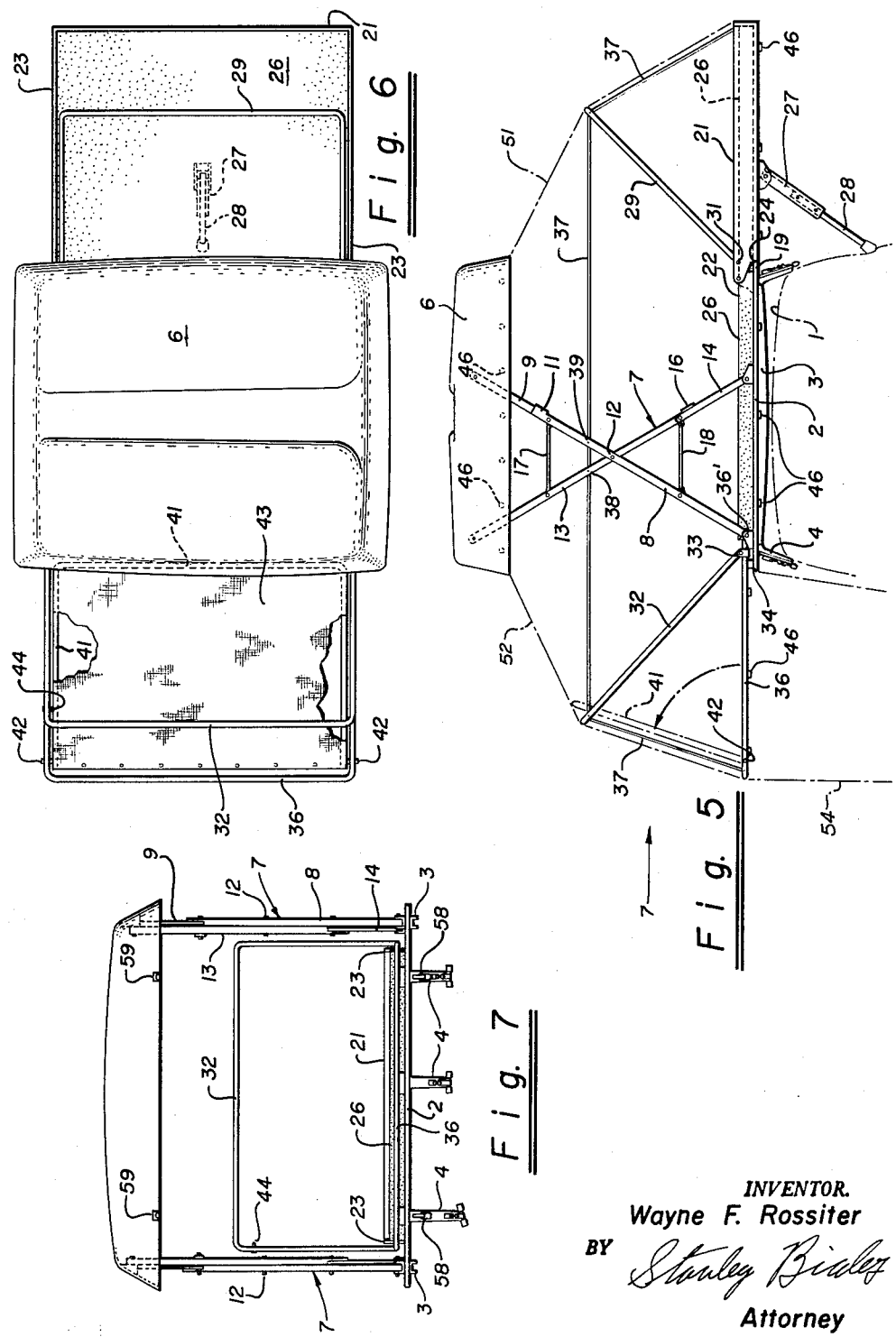
INVENTOR.
Wayne F. Rossiter
BY Stanley Bisley
Attorney

United States Patent Office 3,009,471
Patented Nov. 21, 1961

3,009,471
SLEEPING BUNK ATTACHMENT FOR
VEHICLES
Wayne F. Rossiter, 922 Roble Ave., Menlo Park, Calif.
Filed Apr. 11, 1960, Ser. No. 21,439
8 Claims. (Cl. 135—4)

This invention relates to a sleeping bunk attachment adapted to be detachably mounted on the top of a vehicle to provide outdoor sleeping quarters for use in camping, and more particularly to such attachment which can be employed with relatively small passenger automobiles, such as are made by foreign car manufacturers.

Summarizing the invention, it comprises a main platform having means for detachable connection to the top of an automobile, and a protective canopy overlying the platform and which is mounted thereon in such manner as to facilitate opening and closing thereof with respect to the platform. Movably attached to the main platform is an auxiliary platform which can be moved from a closed position underneath the canopy when it is closed to an extended position from one side of the main platform and beyond a side of the vehicle when the canopy is opened, to provide in combination with the main platform suitable sleeping quarters for two people extending transversely with respect to the vehicle.

Desirably, although not essential, an extension arrangement is movably connected to the side of the main platform opposite to that to which the auxiliary platform is connected to provide when extended suitable means projecting beyond the opposite side of the vehicle for supporting cover sheeting providing a covered enclosure for dressing or undressing purposes. The entire arrangement is such that all parts can be housed over the main platform and under the canopy when the canopy is closed over the main platform, to thus provide weather and dust proof protection.

From the preceding, it is seen that the invention has as its objects, among others, the provision of a sleeping bunk attachment of the character described which is of simple and economical construction, can be employed on a relatively small size automobile, and which can be easily set up from a closed to an open position and vice versa. Other objects of the invention will become apparent from the following description.

Referring to the drawings for a more detailed description,

FIG. 5 is an enlarged side elevational view illustrating the attachment completely set up with detachable cover sheeting shown in phantom lines;

FIG. 6 is a top plan view of the structure shown in FIG. 5;

FIG. 7 is an elevational view looking in the direction of arrow 7 in FIG. 5;

The attachment is arranged to be mounted so as to extend transversely of or across the top of a vehicle 1 when opened. This is especially desirable for a small vehicle of the character pointed out because of space limitations. However, it can be so dimensioned as to fit larger vehicles if so desired.

It comprises a main platform or deck 2 having suitable braces 3 attached to the underside thereof. Adjacent each side of the platform are fixedly attached spaced apart fastening clamps 4 adapted to connect fixedly but detachably the entire attachment to the sides of the vehicle adjacent the top thereof. The clamps are commonly employed for securing luggage racks or the like to vehicle tops and may be of any suitable type. As can be noted from FIGS. 1 and 7, the lower ends of the clamps at each side are of varying length to conform to the configuration of the part of the vehicle, usually the rain gutter, to which the clamps are attached and tensioned.

Figure 1:
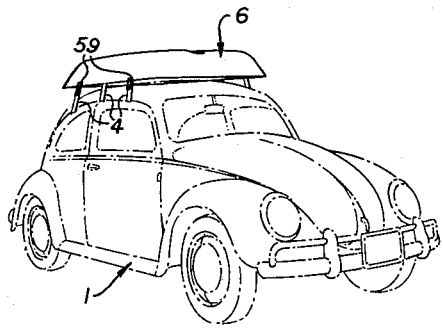
FIG. 1 is an isometric view of the attachment mounted on a vehicle shown in phantom lines, and which is of a very popular foreign make, known as a Volkswagen.

Means is provided for movably supporting a protective canopy 6 over the main platform, which can be readily elevated in an upright direction from a closed position shown in FIG. 1 to a fully open position illustrated in FIG. 5, and vice versa; the canopy being desirably of inverted pan shape to provide in combination with the main platform when the canopy is closed complete housing and protection of all appurtenances forming part of the equipment which will be described. The mounting means for the canopy comprises a lazy tong-type linkage connection illustrated generally by reference numeral 7 which permits up and down movement of the canopy without the use of sliding parts, thus making for simplicity and economy.

Referring to FIGS. 1 through 4, and 7, linkage connection 7 is the same at each end of platform 2, namely, the edges that face the front and rear of the vehicle, respectively; and at each end the linkage comprises a long link 8 pivotally connected to the platform adjacent an end thereof and which is of such length that when collapsed on the platform it fits between the opposite sides thereof. Pivotally connected adjacent the top of link 8 is a short link 9 which is also pivoted to an end of canopy 6. Long link 8 and short link 9 form one jointed link structure. In the collapsed position of the canopy, link 9 folds to the left with reference to FIG. 5 and in the extended position of the canopy, link 9 forms a fixed extension of link 8, being held in position by the weight of the canopy against a suitable stop 11 at the end of link 8.

Pivotally connected at 12 to and crossing link 8 is another relatively long link 13 which is also pivoted at its upper end to an end of canopy 6 inside thereof. At its lower end, link 13 is pivotally connected to a short link 14 the lower end of which is pivoted to main platform 2. Links 13 and 14 form a second jointed link structure. Also, link 14 operates with reference to link 13 in the same manner as link 9 with respect to link 8; and in the extended position of link 14 it engages a stop 16 at the lower end of link 13 to provide a fixed extension of link 13. By virtue of the short links 9 and 14, the entire linkage can be collapsed in a relatively short space substantially no greater in length than long links 8 and 13, as is indicated in FIG. 2.

Interconnected between link 13 and the pivotal connection between links 8 and 9 is an elastic stretchable rubber cord 17, which may be a coil spring if so desired; and a similar connection 18 is provided between link 8 and the pivotal connection between links 13 and 14. In the extended or fully elevated position of canopy 6, resilient connections 17 and 18 are under slight tension. When the canopy is lowered in the manner shown in FIGS. 4 through 2, resilient connections 17 and 18 are stretched, and are thus placed under considerable tension. As a result, a servo-like connection is provided between platform 2 and canopy 6 which counterbalances the weight of the canopy, thus enabling one to raise canopy 6 in the manner shown in FIGS. 2 through 4 with minimum effort.

In this connection, in the closed position of the canopy, short links 9 and 14 are at substantially dead center with reference to resilient connections 17 and 18, respectively. Hence, the canopy will remain closed unless a lifting force is exerted thereon. Since the described lazy tong-type linkages 7 are spaced apart at the front and rear ends of the main platform and canopy, unobstructed space exists therebetween for accommodating at least two persons.

Figure 2:
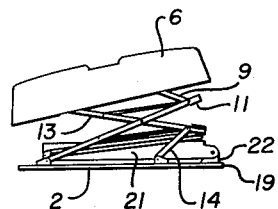
FIG. 2 is a side elevational view of the attachment with the canopy thereof just partially opened.
Figure 3:
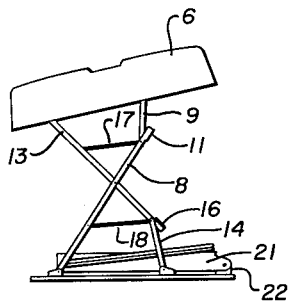
FIG. 3 is a similar view with the canopy almost completely opened.
Figure 4:
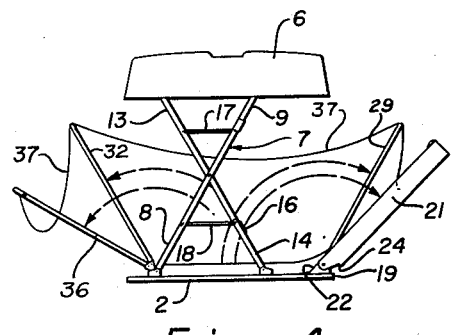
FIG. 4 is also a similar view with the canopy completely extended, and illustrating the position of various parts of the attachment in an initially set up position.

Movably connected to one side 19 of plateform 2 is an auxiliary platform 21 which can be shifted from a position over main platform 2 as shown in FIG. 2 to form a 180° extension of the main platform beyond one side of vehicle 1 as shown in FIG. 5. Although auxiliary platform 21 could be slidably mounted to provide such extension, it is desirably pivotally connected to main platform 2 on brackets 22 secured to the platform, so that it can be swung to an extended position from a collapsed position over the main platform.

Auxiliary platform 2 includes spaced apart upright side members 23; and the inner edge of the platform is notched at 24 to provide a stop against side 19 of main platform 2 in the extended position of the auxiliary platform. Spaced apart sides 23 of the main platform provide a wide channel for receiving a mattress 26 desirably of a readily foldable foamed plastic type which overlies substantially the entire length of main platform 2 and auxiliary platform 21 in the extended position thereof, and which can be folded at the pivotal junction between the main and auxiliary platforms to become housed in folded condition underneath the auxiliary platform when the attachment is closed.

The lengths of main platform 2 and auxiliary platform 21 are such that in the extended position of auxiliary platform 21 a sleeping bunk is provided of about 6 ft. 2 inches, with the auxiliary platform 21 providing the foot of the bunk deck. If desired, the parts may be so proportioned as to provide a longer bunk.

As an additional bracing for auxiliary platform 21 besides the stop at 19, an additional bracing structure can be provided comprising a channel-shaped link 27 pivotally connected to the underside of the auxiliary platform, and which is also pivotally connected to another link 28 that can be folded inwardly into the channel, the rear face of channel link 27 providing a stop for link 28 in its extended position. The lower end of link 28 is provided with a rubber tip which when the attachment is set up, can frictionally engage at a suitable point along a side of the vehicle, such as a door window-sill, to provide the additional bracing support.

Means is also provided on the attachment for detachably supporting cover sheeting when the attachment is fully set up. For this purpose, a U-shaped cover support frame 29 is pivotally attached at 31 to the inner end of auxiliary platform 21, and another similar cover support frame 32 is pivotally attached at 33 adjacent the side edge 34 of main platform 2 opposite side edge 19; the pivots 33 being on brackets secured to another U-shaped cover frame 36 which is pivotally connected at 36′ adjacent the point where links 8 are pivoted. Cover frame 36 can be pivoted to a horizontal extended position beyond the side of the vehicle opposite the auxiliary platform side.

The cover support frames are all tied together by strong flexible cord or rope 37, such as nylon cord, at each end. Cord 37 is fixedly anchored to both cover support frames 32 and 29 and also to links 13 and 8 at 38 and 39, respectively, to position such frames when they are set up. At its ends, each cord 37 is fixedly anchored to auxiliary platform 21 adjacent its outer side and to cover frame 36 adjacent its outer side. From the preceding, it is seen that the cords, although tying the aforementioned parts together, permit inward collapsing of all of the described cover support frames since the cords 37 are flexible.

In the set up condition of the attachment, auxiliary platform 21 extends beyond one side of the vehicle as can be seen from FIG. 5, while U-shaped frame 36 projects substantially equally beyond the other side. Frame 36 supports another U-shaped frame 41 which is pivoted at its outer side at 42 to the cover frame 36 and supports a fabric or other suitable cover 43. Frame 41 and its supporting cloth 43 form a trap door which can be opened to the position shown in phantom lines in FIG. 5 to permit access to the bunk when it is covered. It can be held in such position by engagement with a spring pressed ball latch 44 on cover frame 32. In the closed position, the trap door cloth 43 rests on the main platform.

Figure 8:
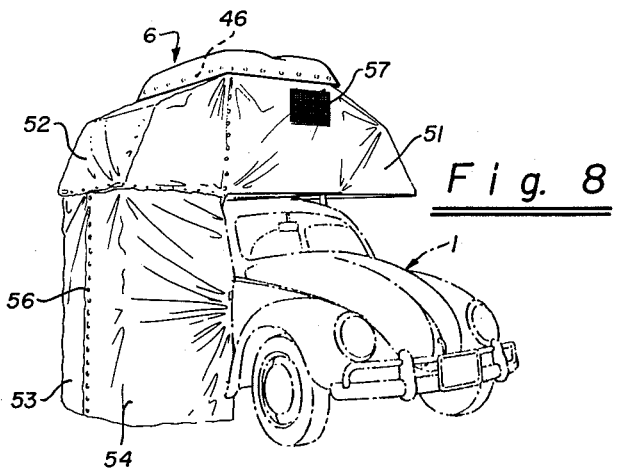
FIG. 8 is an isometric view of the attachment in fully set up position on the vehicle, and with the protective cover sheeting attached thereto.

Suitable snap fasteners 46 are provided at various suitable locations inside of canopy 6 and on the underside of the main and auxiliary platforms for attachment thereto of various cover cloth sheeting to close completely the bunk after it has been set up. With reference to FIG. 8, these cover cloths comprise on section 51 for completely enclosing the front and rear ends of the bunk including auxiliary platform 21.

Another cover section 52 covers the remainder of the bunk over trap 43, being secured to section 51 by snap fasteners and to the canopy by snap fasteners. Third and fourth sections 53 and 54 are detachably connected to section 52 by snap fasteners and clamped in door hinge openings of the vehicle. Ready access within covers 53 and 54 can be had by pulling the sections apart, and these sections are secured together by snap fasteners 56 accessible from the inside.

Thus, when the cover sheeting, which is all conventional waterproofed canvas or cloth, are all connected, the bunk is completely covered and access may be had thereto by opening trap 43. A suitable rope ladder (not shown) which can be detachably connected at its upper end to the attachment, is provided as part of the kit for enabling climbing into the bunk. When individuals are in the bunk, the trap door may be closed, thus rendering it difficult for unauthorized individuals gaining access to the bunk without persons therein becoming alerted. For ventilation purposes, suitable open screens 57 are desirably provided in cover section 51 at the front and rear ends thereof.

Cover canopy 6 can be desirably made of suitable light weight plastic material, while all the linkages and cover frame parts are desirably made of light weight stainless steel or aluminum tubing.

All of the described parts including the cover sections 51, 52, 53 and 54, and also pillows and blankets can be enclosed within canopy 6 when the attachment is closed, to provide a compact neat appearing housing structure, wherein the contents are fully protected against dust and rain. Suitable toggle trunk latches 58 are hingedly connected to end fastening clamps 4 at each side, to engage latch elements 59 on the canopy when the canopy is closed. This mechanism is common on trunks; and suitable padlocks may be employed to lock the latches to prevent unauthorized access to the contents of the closed canopy.

Although it is desirable to have the trap door hinged at 42 and provide the dressing quarters indicated, cover frames 32 and 36 and related parts and cover sections 52, 53 and 54 can be omitted, and a covering section hung vertically from the left side of the canopy with reference to FIG. 8, as the main platform 2 and the auxiliary platform 21 when extended provide the necessary length for the support of two individuals.

I claim:

1. A sleeping bunk attachment for mounting on the top of a vehicle comprising a main platform, a canopy over said main platform, means interconnected between the platform and the canopy supporting the canopy for movement from a closed position to an open position relative to the main platform and vice versa, an auxiliary platform, and means mounting said auxiliary platform on said attachment for movement from a position under said canopy to a position extending from a side and substantially in the plane of said main platform and vice versa to form a bunk in combination with said main platform in the extended position of the auxiliary platform.

2. A sleeping bunk attachment for mounting on the top of a vehicle comprising a main platform, a canopy over said main platform, means interconnected between the main platform and the canopy supporting the canopy for movement in an upright direction from a closed position to an open position and vice versa relative to said main platform, an auxiliary platform over said main platform in the closed position of said canopy, and means hingedly connecting said auxiliary platform to the main platform adjacent a side of the main platform for movement to a position extending from said side and substantially in the plane of said main platform to form a bunk in combination with said main platform.

3. A sleeping bunk attachment for mounting on the top of a vehicle comprising a main platform, a canopy over said main platform, means interconnected between the main platform and the canopy supporting the canopy for movement in an upright direction from a closed position to an open position and vice versa relative to said main platform, an auxiliary platform over said main platform in the closed position of said canopy, means hingedly connecting said auxiliary platform to the main platform adjacent a side of the main platform for movement to a position extending from said side and substantially in the plane of said main platform to form a bunk in combination with said main platform, and means for detachably supporting cover sheeting about said attachment, including a cover frame pivotally connected to the attachment adjacent said side of the main platform.

4. A sleeping bunk attachment for mounting on the top of a vehicle comprising a main platform, a canopy over said main platform, means interconnected between the main platform and the canopy supporting the canopy for movement in an upright direction from a closed position to an open position and vice versa relative to said main platform, an auxiliary platform over said main platform in the closed position of said canopy, means hingedly connecting said auxiliary platform to the main platform adjacent a side of the main platform for movement to a position extending from said side and substantially in the plane of said main platform to form a bunk in combination with said main platform; and means for detachably supporting cover sheeting about said attachment including a U-shaped cover frame pivotally connected to the attachment adjacent said side of the main platform, and a second U-shaped cover frame pivotally connected to the attachment adjacent the opposite side of the main platform.

5. A sleeping bunk attachment for mounting on the top of a vehicle comprising a main platform each side of which is adjacent a side of the vehicle when the main platform is mounted thereon, an inverted pan shaped canopy over said main platform the open part of which is of a size to cover substantially said main platform to provide in combination with said main platform a protective housing when the canopy is in a closed position over said main platform, a lazy tong-type linkage connection between each end of the main platform and the corresponding end of the canopy supporting the canopy for movement in an upright position from said closed position to an open position and vice versa relative to said main platform, each linkage comprising a pair of crossing jointed link structures pivotally connected at their tops to said canopy at fixed spaced apart locations and at their bottoms to said main platform also at fixed spaced apart locations, an auxiliary platform over said main platform and housed by said canopy in the closed position thereof, and means mounting said auxiliary platform on said attachment for movement to a position extending from a side and substantially in the plane of said main platform and beyond a side of said vehicle to form a bunk in combination with said main platform.

6. A sleeping bunk attachment for mounting on the top of a vehicle comprising a main platform each side of which is adjacent a side of the vehicle when the main platform is mounted thereon, an inverted pan shaped canopy over said main platform the open part of which is of a size to cover substantially said main platform to provide in combination with said main platform a protective housing when the canopy is in a closed position over said main platform, a lazy tong-type linkage connection between each end of the main platform and the corresponding end of the canopy supporting the canopy for movement in an upright position from said closed position to an open position and vice versa relative to said main platform, each linkage comprising a pair of crossing jointed link structures pivotally connected at their tops to said canopy at fixed spaced apart locations and at their bottoms to said main platform also at fixed spaced apart locations, an auxiliary platform over said main platform and housed by said canopy in the closed position thereof, means hingedly connecting said auxiliary platform to the main platform adjacent a side of the main platform for movement to a position extending from said side substantially in the plane of said main platform and beyond a side of said vehicle to form a bunk in combination with said main platform, and a U-shaped cover frame pivotally connected to the attachment adjacent said side of the main platform for supporting cover sheeting.

7. The attachment of claim 6 wherein resilient counterbalancing means is connected to said lazy tong-type linkage to counterbalance the weight of the canopy and thus facilitate opening thereof.

8. A sleeping bunk attachment for mounting on the top of a vehicle comprising a main platform; a canopy over said main platform; a lazy tong-type linkage connection between each of opposite ends of the main platform and the corresponding end of the canopy supporting the canopy for movement in an upright direction from a closed position to an open position relative to the main platform and vice versa; said linkage at each end comprising a first long link pivotally connected to the platform at its lower end, a second long link crossing said first long link and pivotally connected to said first long link and to the canopy at its upper end, a first short link pivotally connected to the upper end of said first long link and at its upper end to said canopy, and a second short link pivotally connected to the lower end of said second long link and its lower end to said platform; an auxiliary platform over said main platform and housed by said canopy in the closed position thereof; and means hingedly connecting said auxiliary platform to the main platform adjacent a side of the main platform for movement to a position extending from and beyond said side substantially in the plane of said main platform to form a bunk in combination with said main platform.

References Cited in the file of this patent

UNITED STATES PATENTS

| | | |
|---|---|---|
| 268,240 | Jones | Nov. 28, 1882 |
| 2,658,212 | Green | Nov. 10, 1953 |
| 2,811,725 | Cence | Nov. 5, 1957 |
| 2,847,018 | Weninger | Aug. 12, 1958 |
| 2,930,051 | Kampmeier | Mar. 29, 1960 |

FOREIGN PATENTS

| | | |
|---|---|---|
| 821,226 | France | Aug. 17, 1937 |